United States Patent [19]

Weiler et al.

[11] Patent Number: 5,472,068
[45] Date of Patent: Dec. 5, 1995

[54] FLOATING-CALIPER SPOT-TYPE DISC BRAKE WITH A LIGHT-METAL BRAKE HOUSING

[75] Inventors: Rolf Weiler, Eppstein; Helmut Rückert, Reinheim; Götz Mehner, Darmstadt, all of Germany

[73] Assignee: ITT Automotive Europe GmbH, Germany

[21] Appl. No.: 129,046

[22] PCT Filed: Apr. 1, 1992

[86] PCT No.: PCT/EP92/00718

§ 371 Date: Oct. 4, 1993

§ 102(e) Date: Oct. 4, 1993

[87] PCT Pub. No.: WO92/17712

PCT Pub. Date: Oct. 15, 1992

[30] Foreign Application Priority Data

Apr. 4, 1991 [DE] Germany .......................... 41 10 870.1
Jan. 29, 1992 [DE] Germany .......................... 42 02 394.7

[51] Int. Cl.⁶ .............................................. F16D 55/2265
[52] U.S. Cl. ...................... 188/73.44; 188/71.1; 192/66.1
[58] Field of Search ............................... 188/71.1, 71.6, 188/73.43–73.45, 369, 370, 73.39; 192/66

[56] References Cited

U.S. PATENT DOCUMENTS

| | | | |
|---|---|---|---|
| 3,438,466 | 4/1969 | Meier ..................... | 188/71.1 |
| 3,887,045 | 6/1975 | DeHoff et al. ........... | 188/73.3 |
| 3,895,693 | 7/1975 | Lucien et al. ........... | 188/71.1 |
| 4,225,017 | 9/1980 | Op den Camp ............ | 188/73.39 X |
| 4,471,858 | 9/1984 | Kawase .................. | 188/73.44 X |
| 4,512,446 | 4/1985 | Chuwman et al. ......... | 188/73.39 X |
| 5,125,482 | 6/1992 | Negishi ................. | 188/73.39 X |

FOREIGN PATENT DOCUMENTS

| | | | |
|---|---|---|---|
| 2506413 | 11/1982 | France .................. | 188/71.1 |
| 1286845 | 1/1969 | Germany . | |
| 1935863 | 1/1971 | Germany . | |
| 2950660 | 7/1981 | Germany . | |
| 3014057 | 10/1981 | Germany ................. | 188/73.39 |
| 3344493 | 6/1985 | Germany . | |
| 3438142 | 4/1986 | Germany ................. | 188/71.1 |
| 3616634 | 11/1987 | Germany ................. | 188/370 |
| 97536 | 7/1980 | Japan ................... | 188/71.1 |
| 83733 | 5/1982 | Japan ................... | 188/71.1 |
| 46034 | 2/1987 | Japan ................... | 188/370 |
| 1161355 | 8/1969 | United Kingdom ......... | 188/71.1 |
| 2087490 | 5/1982 | United Kingdom ......... | 188/71.1 |
| 2173268 | 10/1986 | United Kingdom . | |

Primary Examiner—Robert J. Oberleitner
Assistant Examiner—Alfred Muratori
Attorney, Agent, or Firm—Dykema Gossett

[57] ABSTRACT

A cast-aluminum floating caliper of a floating-caliper spot-type disc brake is reinforced by means of reinforcing elements of a high-tensile material. In accordance with one embodiment of this invention the floating caliper is provided with recesses in an area adjacent the brake disc and the brake shoes. Bolts extend through the recesses in the direct vicinity of the radially outside brake disc edge. Commercially available steel bolts preferably are used. These measures optimize the floating caliper weight, stiffness and manufacturing cost.

19 Claims, 7 Drawing Sheets

FIG 4
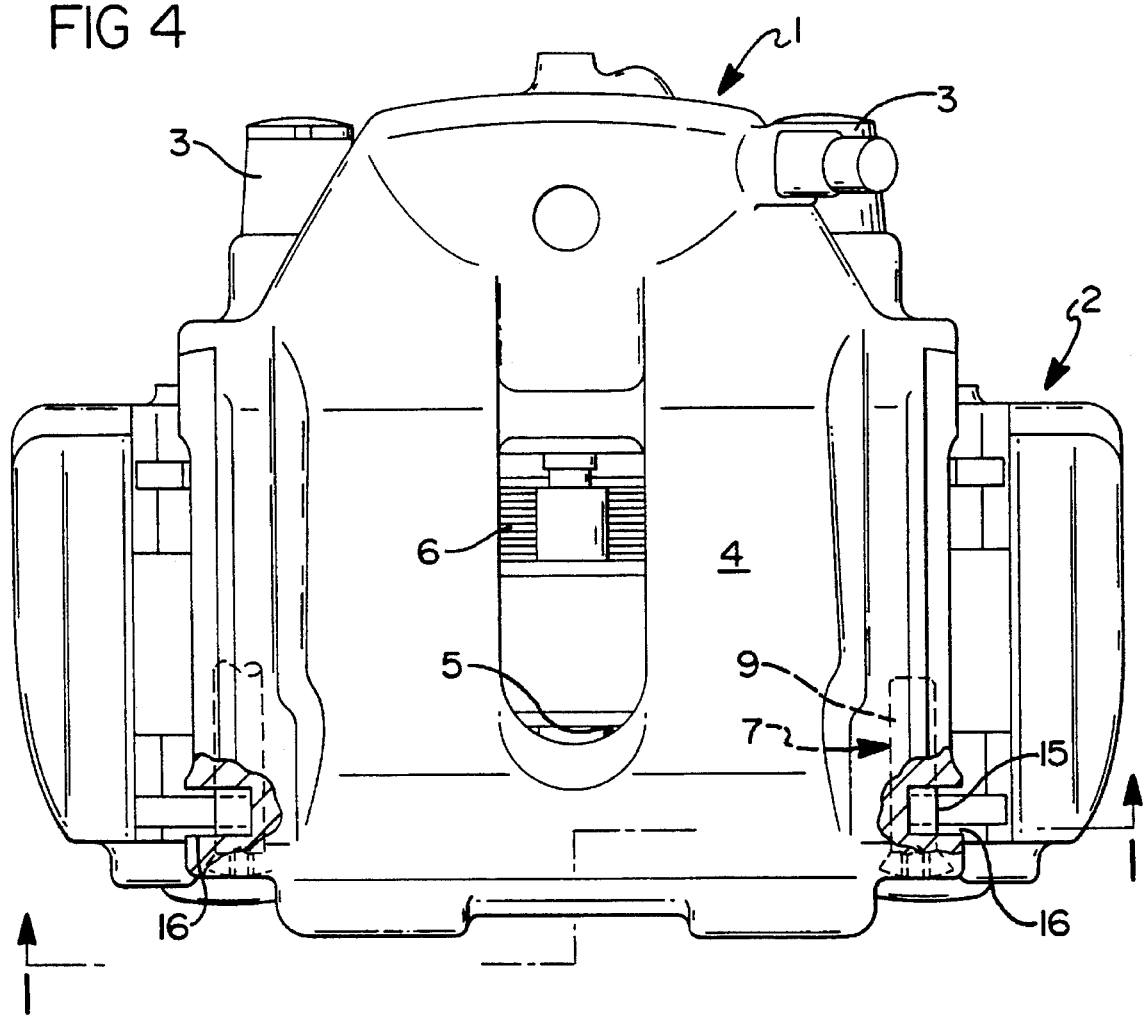
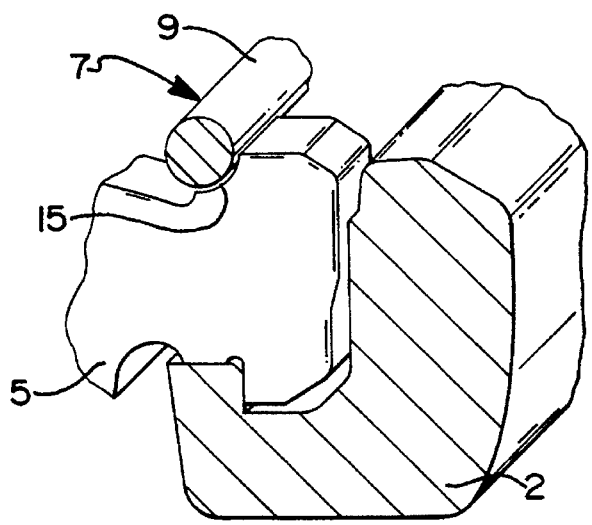
FIG 5
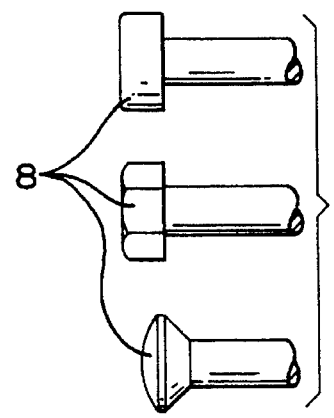
FIG 6

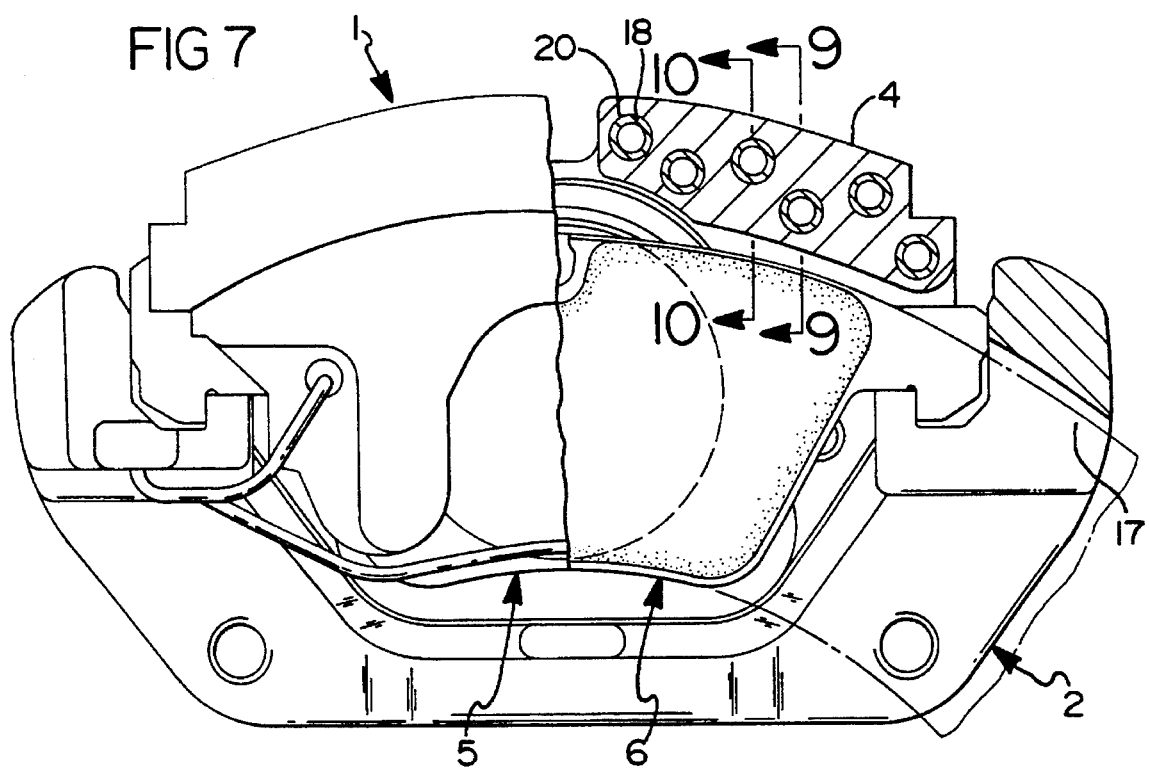
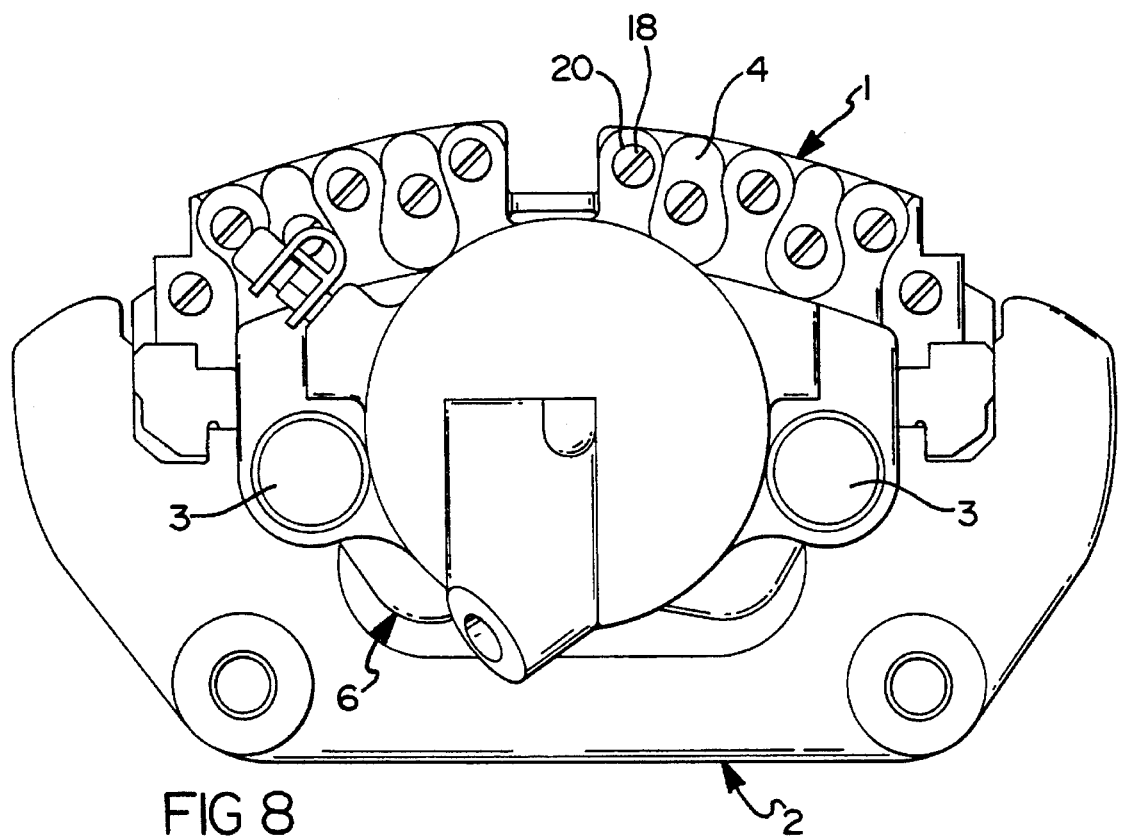

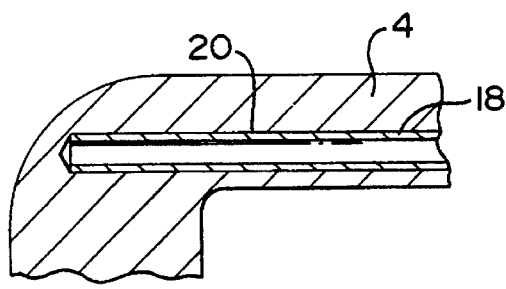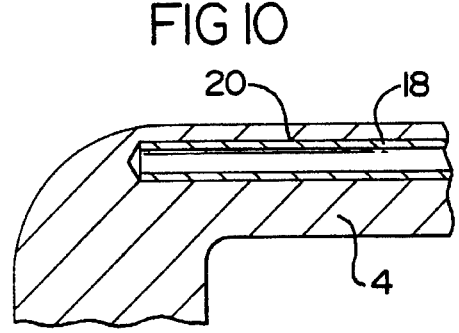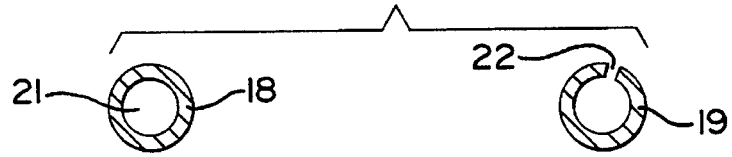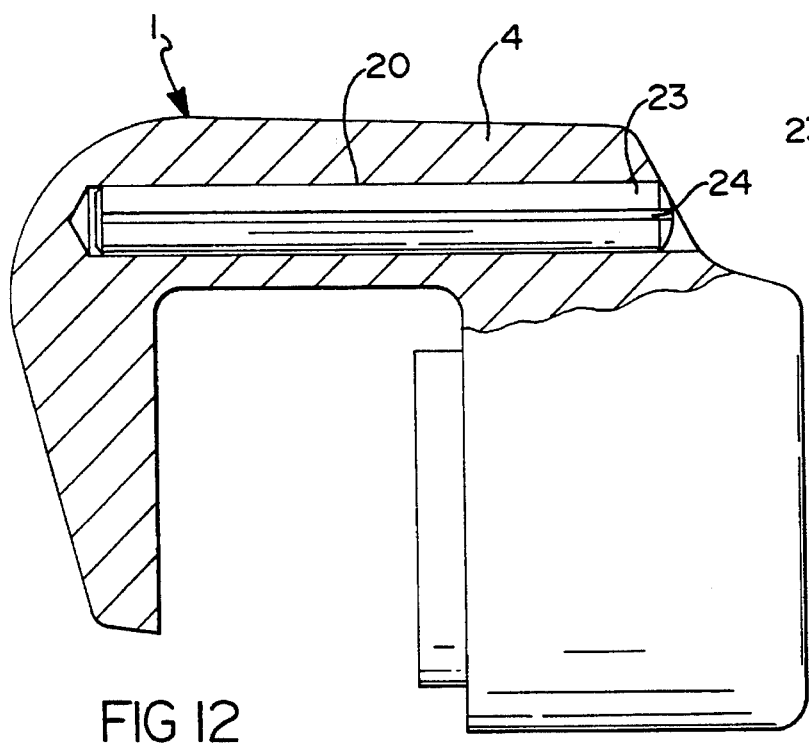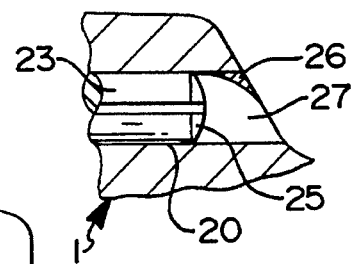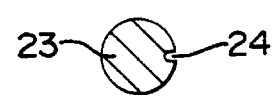

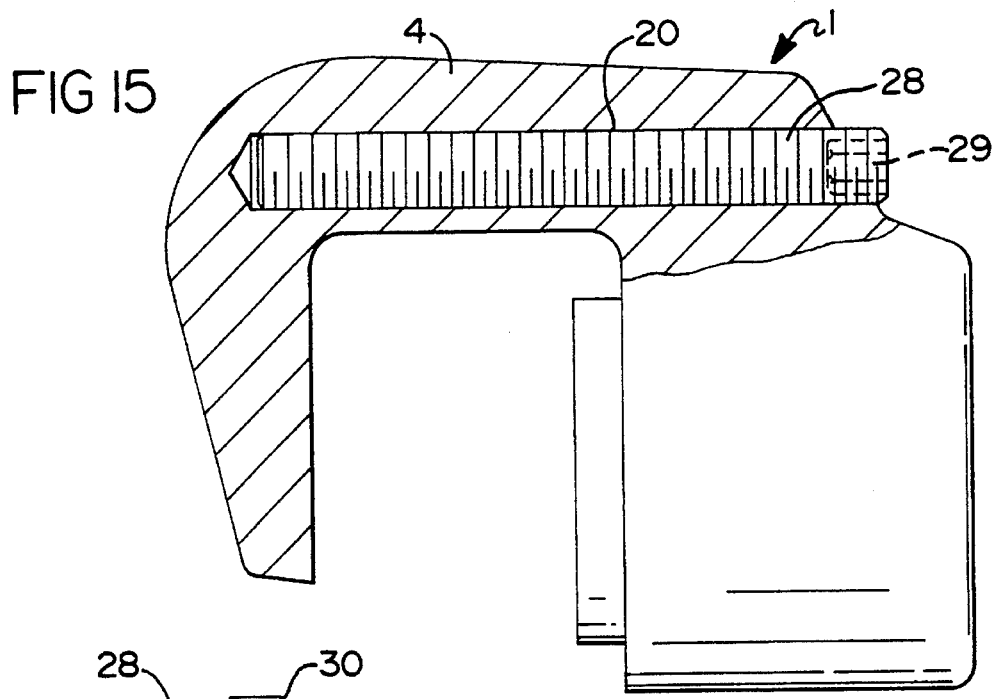
FIG 15
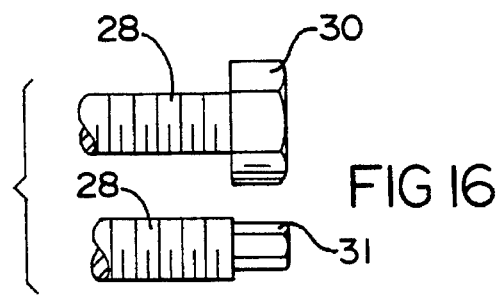
FIG 16
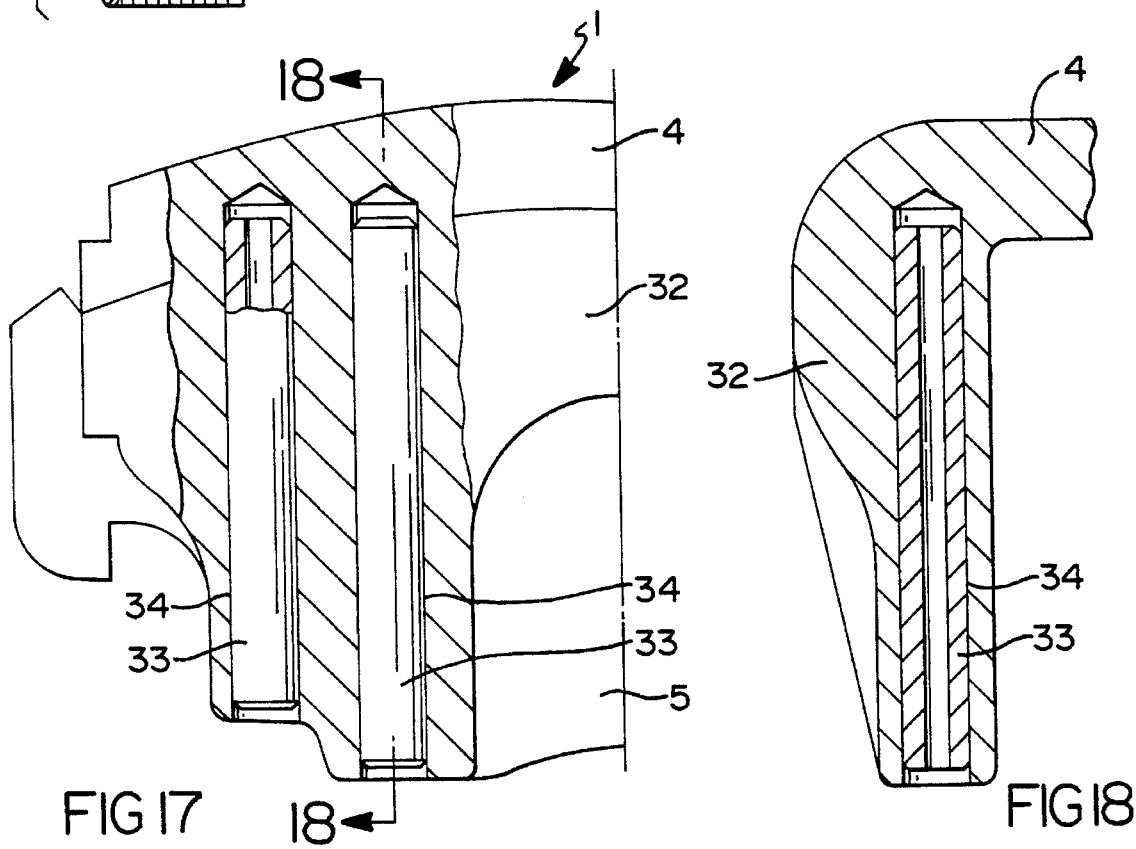
FIG 17
FIG 18

FLOATING-CALIPER SPOT-TYPE DISC BRAKE WITH A LIGHT-METAL BRAKE HOUSING

BACKGROUND OF THE INVENTION

This invention relates to a floating-caliper spot-type disc brake for automotive vehicles whose brake housing is a light-metal casting reinforced by means of bolts or sleeves of a high-tensile material.

It is a general object to reduce the weight of automotive vehicles in order to reduce fuel consumption. One particular interest is to keep the unsprung masses, arranged at the vehicle wheel, as small as possible in order to improve driving. It is for these reasons that light-metal construction becomes more and more important for vehicle brakes.

In some spot-type disc brakes, a U-shaped floating caliper transmits the high clamping force required for pressing the brake shoes to the brake disc. In such an action, a caliper bridge straddling the brake disc is exposed to high bending loads. The floating caliper must have a great stiffness to prevent it from bending up in an unduly wide manner. On the other hand, the radial assembly space between the outside edge of the brake disc and the wheel rim is limited. Therefore, there exists the need of providing a high-tensile material with a high elasticity modulus for the floating caliper. The use of cast iron or similar high-tensile materials is widely accepted. These materials, however, have a relatively high specific weight. Light metals such as aluminum or light alloys, however, have little elasticity moduli. This is at least the case when the material price is to be within economically justifiable limits.

Now, from the German Published Patent Application DE-OS No. 29 50 660, for instance, there are known spot-type disc brakes with a light-metal floating caliper where areas of the caliper housing that are subject to particularly strong loads are reinforced with cast-in inserts of a high-tensile material. The disadvantage of these caliper housings is that the inserts are completely jacketed by light-metal, with the surface zones which are neighboring on the brake disc and which are particularly subject to great tension load being of light metal. Moreover, due to their shape adapted to the floating caliper, the inserts must be specifically manufactured for this purpose which causes relatively high additional costs.

In a generic disc brake known from German Published and Examined Patent Application DE-AS No. 12 86 845 the floating caliper is reinforced by a screw bolt arranged in an axially parallel bore of the caliper bridge. Disadvantageously, in this arrangement, the bolt is not arranged in the area of the caliper bridge which is subject to particularly strong tension load and which is directly neighboring on the radially outside edge of the brake disc and on the brake shoes. Moreover, a special bolt is used which features a complicated design and, thus, is expensive.

SUMMARY OF THE INVENTION

It is an object of this invention to optimize a generic spot-type disc brake with regard to the weight and stiffness of the caliper housing without enlarging the assembly space.

A first embodiment of this invention has an advantageously small weight by using cast aluminum and by means of the recesses of the caliper bridge. The stiffness of the floating caliper is optimized by the arrangement of the bolts in the direct vicinity of the brake disc. The inventive brake with a reduced weight essentially has the same dimensions and comparable performances as a brake of traditional material such as cast iron, with the manufacturing cost staying within economically justifiable limits.

In a first preferred embodiment of the inventive floating caliper, commercially available steel screw bolts are used that can be acquired at particularly favorable cost. The stiffness of the floating caliper is further increased by prestressing the bolts.

In another preferred embodiment of this invention, a floating caliper radially supported on a brake shoe is supported via the bolts. The advantage of this arrangement is the prevention of increased wear of the caliper housing at the points of support.

A second embodiment of this invention includes arranging reinforcing elements in the form of cylindrical pins or sleeves in the floating caliper. The pins or sleeves are essentially inserted into bores of the caliper bridge without axial prestress. In the area of the caliper bridge, the floating caliper is deformed mainly by a bending load and, to a considerably lesser extent, by a tension load. The abandoning of axial prestress thus has but a slight influence on the stiffness of the floating caliper. On the other hand, however, there thus results the advantage that the bores of the caliper bridge and the pins or sleeves can be constructed without threads and thus can have a particularly simple design. The pins or sleeves allow a simple and low-cost manufacture. The cost of assembly is also reduced as the pins or sleeves only have to be plugged into the caliper bridge. In order to ensure a high strength of the reinforcing elements the same are preferably of steel and their surfaces can be nickeled and/or galvanized.

In a preferred embodiment the reinforcing elements have the design of hollow cylindrical sleeves or tubes. This further reduces the weight of the floating caliper without any essential effects on its stiffness. If the sleeves or tubes are additionally provided with a full-length slot in the longitudinal direction this will render the advantage of enabling the compensation of certain manufacturing tolerances with regard to the diameters of the bores in the caliper bridge. The mentioned tolerance compensation will ensure a clamping of the reinforcing elements so as to not get lost, particularly so in case of a press fit of the reinforcing elements in the bores.

In another simple embodiment massive cylindrical pins are provided as reinforcing elements; the pins can further be improved by a groove running over their entire length. If the bores of the caliper bridge have the design of pocket bores the groove will serve as air-bleed duct when the true-to-size pins are pressed into the pocket bores.

In a further development of this invention the reinforcing elements are secured by means of a deformation of the open end of the pocket bores. This measure is particularly recommendable if massive pins are used as the elasticity of the press fit cannot ensure in any case that the pins will be held in the bores so as to not get lost. In this context it may be pointed out that the floating caliper and the pins are made of different materials with different thermal expansion coefficients.

In order to reinforce the caliper bridge as evenly as possible in all its regions an embodiment is recommended where, altogether, twelve reinforcing elements with relatively small diameters are arranged in twelve bores of the caliper bridge symmetrical relative to the brake center. In this arrangement, preferably six reinforcing elements, respectively lie in each of two rows on top of each other, with the two rows being staggered relative to each other in the circumferential direction of the brake disc.

In case of higher demands on the stiffness of the floating caliper a further development of this invention is recommended where, additionally, a leg of the floating caliper, which is adjacent to the caliper bridge, is reinforced by the arrangement of further reinforcing elements.

Another embodiment of this invention includes the caliper bridge of the floating caliper being mainly made of cast aluminum and provided with bores essentially running parallel to the brake disc axis and manufactured with a smooth inside surface, their manufacture being easy. The reinforcing elements used in this embodiment are screw bolts having a threading structure over their entire screw-in lengths which will cut a thread into the smooth bores when the bolts are screwed in. This inventive arrangement has the advantage that, when manufacturing the brake, a thread-cutting operation can be saved and no metal chips will form. Furthermore, this solution permits higher manufacturing tolerances for the diameters of the bores than does an arrangement with pins pressed in. Higher manufacturing tolerances again allow a more cost-saving manufacture. Further functional advantages of this solution include that the material of the caliper bridge in the area of the thread formed by the bolts is reinforced because of the cold working process. This will provide the thread with a high trip resistance and with a high loosening moment.

In the following detailed description, examples of embodiments of this invention will be explained in more detail, with reference being made to the appended drawings.

BRIEF DESCRIPTION OF THE DRAWINGS

FIG. 4 is a top view in partial section of a third embodiment of the inventive brake.

FIG. 5 is a perspective view of a detail of a portion of the same brake as illustrated in FIG. 4.

FIG. 6 shows three examples of embodiments of the heads of the bolts in FIG. 4.

FIG. 7 is a side view in partial section of a fourth embodiment of the inventive brake.

FIG. 8 is a side view of the same brake illustrated in FIG. 7 as seen from the opposite direction.

FIG. 9 is a section taken along line 9—9 of FIG. 7.

FIG. 10 is a section taken along line 10—10 of FIG. 7.

FIG. 11 shows cross-sections of two differently designed sleeves with and without a slot.

FIG. 12 is an elementary sketch in partial section of a floating caliper reinforced by massive cylindrical pins.

FIG. 13 is a detail view of a portion of FIG. 12 with a securing measure for a massive pin.

FIG. 14 shows a cross-section of a massive pin.

FIG. 15 is an elementary sketch in partial section of a fifth embodiment of a floating caliper with screw bolts.

FIG. 16 shows two examples of embodiments of the heads of the screw bolts of FIG. 15.

FIG. 17 is a side view in partial section of a sixth embodiment of a floating caliper with a leg reinforced by further pins.

FIG. 18 is a section along line 18—18 of FIG. 17.

DETAILED DESCRIPTION OF THE PREFERRED EMBODIMENTS

Figure 1:
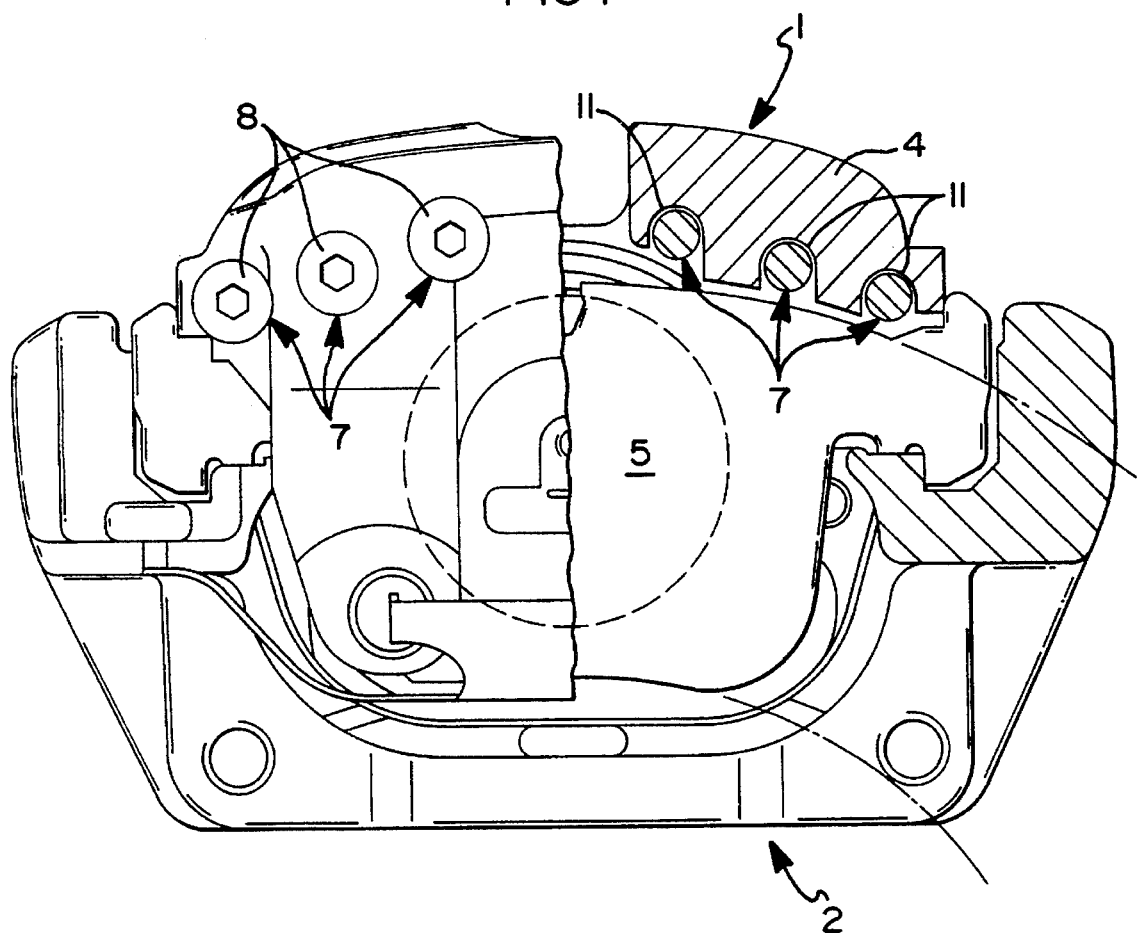
FIG. 1 is a side view of a first embodiment of the inventive brake in a partial section as it would be viewed along a line such as line 1—1 of FIG. 4.
Figure 2:
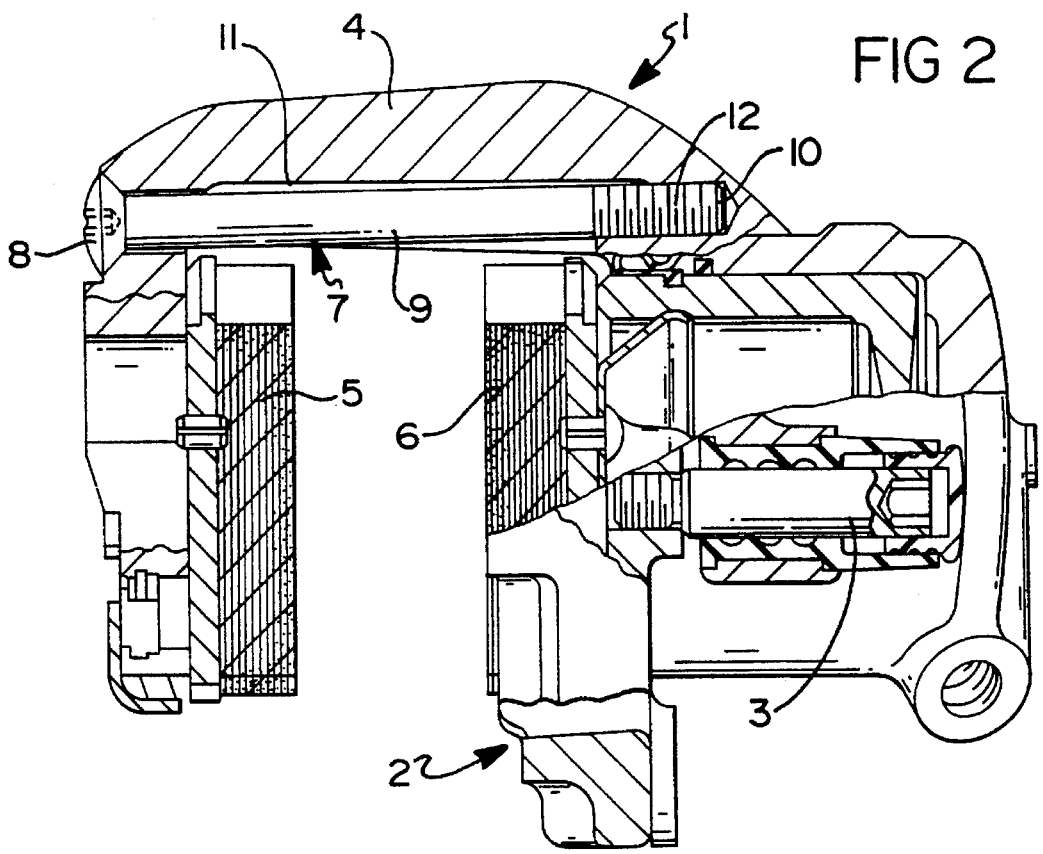
FIG. 2 is another side view in partial section of the same brake illustrated in FIG. 1.
Figure 3:
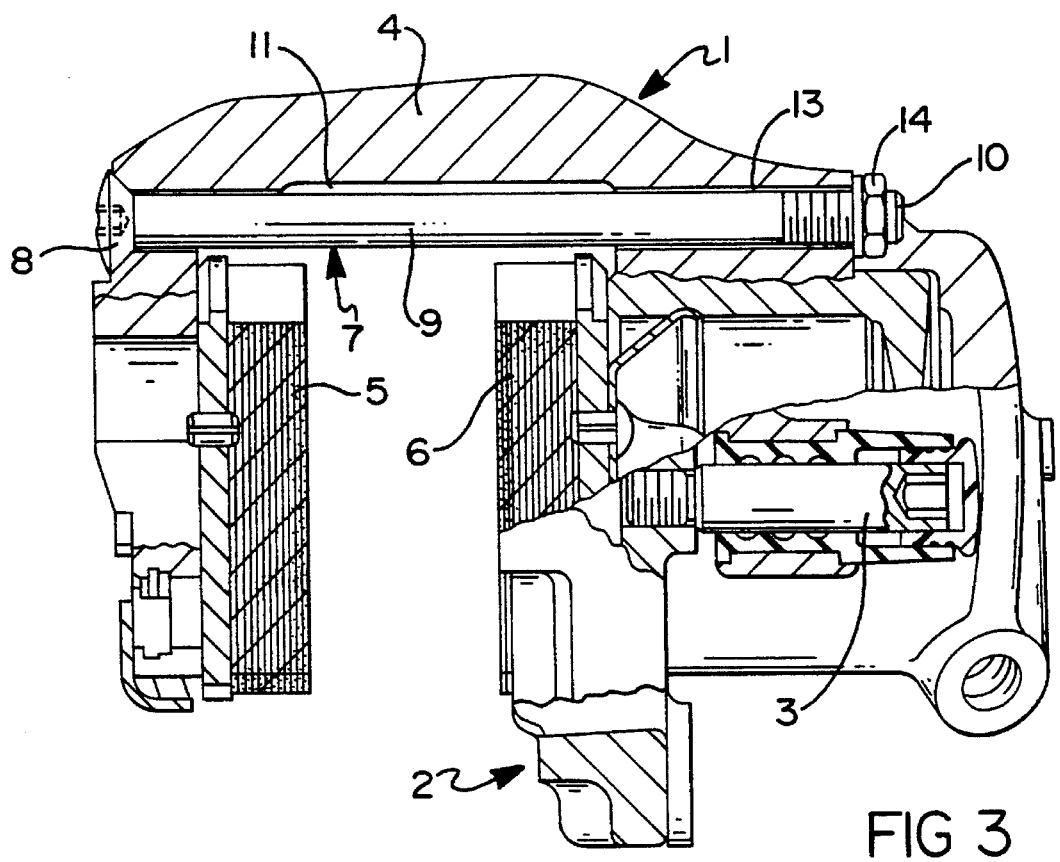
FIG. 3 is a side view in partial section of a second embodiment of the inventive brake.

Referring first to FIGS. 1 through 4, a generic floating-caliper spot-type disc brake has a floating caliper 1 of cast aluminum whose profile is U-shaped and which is displaceably supported on a brake carrier 2 by means of bolt guides 3. The floating caliper 1 has a caliper bridge 4 axially straddling the two brake shoes 5 and 6 and a brake disc (not shown). Inside the caliper bridge 4, six steel bolts 7 are axially arranged each of which has a head section 8, a mid-section 9 and an end section 10. End section 10 is provided with a screw thread. In the through area of the bolts 7, the caliper bridge 4 has recesses 11 penetrated by the mid-sections 9. On the axially outside sides of the caliper bridge 4, the bolts 7 are positively connected with the floating caliper 1. In this arrangement, the end section 10 can either be screwed into a thread 12 of the floating caliper 1 as shown in FIG. 2 or it can pass through a bore 13, as shown in FIG. 3, and be engaged outside the floating caliper 1 by means of a screw nut 14. Besides the lenticular heads 8 of the bolts 7 shown in FIGS. 1 through 3 there are also recommended the cylinder-type or hexagonal heads shown in FIG. 6.

In the further developed disc brake shown in FIGS. 4 and 5, the outside axial side of the floating caliper 1 is supported on a radially outside narrow side 15 of the brake shoe 5. The floating caliper 1 has recesses 16 on the points provided for support. A bolt 7 runs through recess 16. The bolt 7 rests with its mid-section 9 on the surface 15 of the brake shoe 5 whereby the floating caliper 1 is supported.

FIGS. 7 through 11 illustrate a further embodiment of an inventive floating-caliper spot-type disc brake. Bolt guides 3 again guide a floating caliper 1 of cast aluminum that is axially displaceable on a brake carrier 2. The caliper bridge 4 extends in the axial direction beyond the outside edge 17 of the brake disc and the brake shoes 5, 6 arranged on both sides of the brake disc (not shown). In the area of the caliper bridge 4, floating caliper 1 is provided with twelve sleeves 18 that serve as reinforcing elements. Sleeves 18 have the design of thick-walled tubes and are arranged in two rows on top of each other and are staggered relative to each other. As is best seen in FIGS. 9 and 10, the sleeves 18 are plugged into pocket bores 20 of the caliper bridge 4. The caliper bridge 4 is reinforced by the sleeves 18 only in case of bending loads. When there is a tension load on the caliper bridge 4 there will essentially be no reinforcement by the sleeves 18 as sleeves 18 in the bores 20 essentially are without axial prestress. Sleeves 18 are preferably made of steel, their surfaces being galvanized and/or nickeled. When plugging or pressing the sleeves 18 into the pocket bores 20 the air contained in the pocket bores 20 may escape through the inner hollow space 21 of sleeves 18 (FIG. 11). FIG. 11 represents the cross-sections of a sleeve 18 and of a modified sleeve 19. Sleeve 19 additionally has a slot 22 extending over the entire length of sleeve 19. The slotted sleeves 19 have a higher elasticity than sleeves 18. Therefore, sleeves 19 always rest with their circumferential surfaces firmly on the inside surfaces of the bores 20, thus ensuring a reliable clamp fit of the sleeves 19 in bores 20 even when the action of heat causes the materials of sleeve 19 and of floating caliper 1 to expand differently.

Massive cylindrical pins 23 are provided as reinforcing elements in a variant of the described example of an embodiment which is represented in FIGS. 12 through 14. Pins 23 are likewise pressed into pocket bores 20. In order to enable the air contained in the pocket bores 20 to escape when the pins 23 are pressed in, the pins 23 are provided with a groove 24 running over their entire length. The press fit of pins 23 in bores 20 may potentially loosen in case of strong temperature variations. A securing measure as illustrated in FIG. 13 is recommended. In FIG. 13 the pin 23 is slightly shorter so as to enable its end 25 to be sunk completely into bore 20. The pin 23 having been pressed in, the opening 27 of bore 20 will be diminished slightly by means of a deformation 26 so that the pin 23 cannot slide out of bore 20 even if it should loosen.

A further example of an embodiment of this invention is illustrated in FIGS. 15 and 16. The caliper bridge 4 of floating caliper 1 again is provided with pocket bores 20 which in terms of arrangement, design and manufacture on principle do not vary from the pocket bores 20 of the preceding examples of embodiments. The difference of this example of an embodiment consists in that screw bolts 28 of steel are provided as reinforcing elements which have a threading structure over their entire screw-in length by means of which a thread is cut into the originally smooth bores 20 when the screw bolts 28 are screwed in. In contrast to the steel bolts 7 of the first example of an embodiment screw bolts 28 thus have a threading structure suitable for forming a thread. This will ensure that the surface area of the screw bolts 28 will rest firmly without play on the inside wall of the bore 20 whereby the caliper bridge 4 and the screw bolts 28 are connected with each other in an extremely rigid manner without play. As previously described, in connection with sleeves 18, the screw bolts 28 will not generate an axial prestress either. This is where they also differ from the steel bolts 7 of the first example of an embodiment. For the purpose of giving access to a screwing tool the steel bolts can be provided with an internal hexagon 29 as shown in FIG. 15 or with an external hexagon 30 or with a star-like screw head 31 as shown in FIG. 16.

FIGS. 17 and 18 illustrate a further variant of an inventive floating-caliper spot-type disc brake which can be realized in conjunction with any preceding example of any embodiment. Floating caliper 1 has a leg 32 adjacent to the caliper bridge 4 and essentially extending parallel to the brake disc. Leg 32 serves to press the abutting brake shoe 5 to the brake disc. Four reinforcing elements in the form of sleeves 33 are provided for reinforcing the leg 32. Out of said sleeves 33 FIG. 17 only shows the two sleeves 33 arranged on the left side of the leg 32. The sleeves 33 are plugged into pocket bores 34. Of course, this variant also permits a design of the reinforcing elements in correspondence with the embodiments illustrated in FIGS. 11 through 16.

Figure 19:
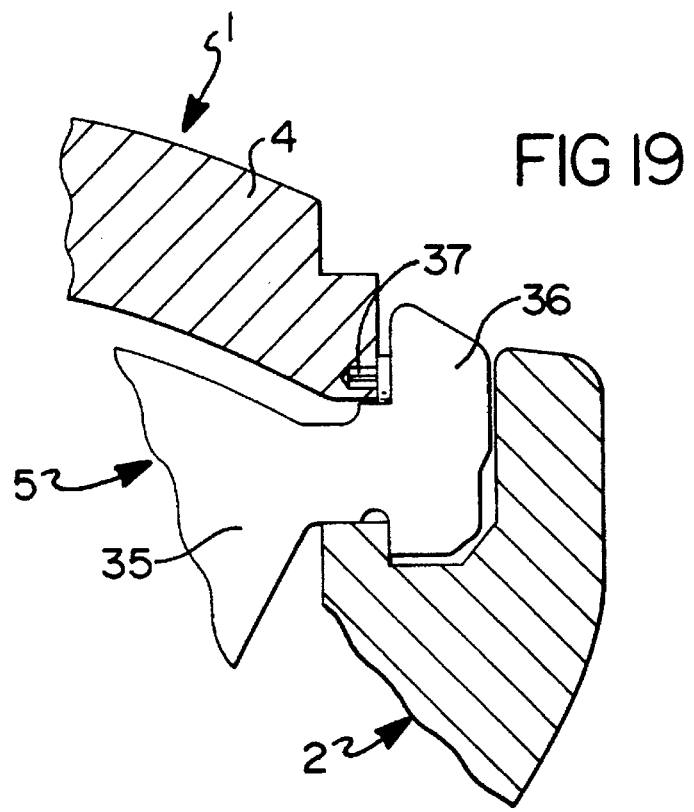
FIG. 19 is an advantageous embodiment of the support of a light-metal floating caliper on a brake shoe.
Figure 20:
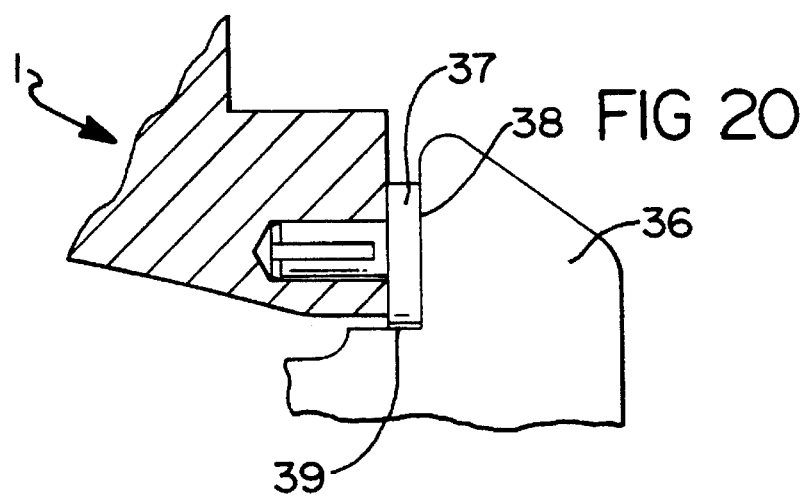
FIG. 20 is an enlarged detail of FIG. 19.
Figure 21:
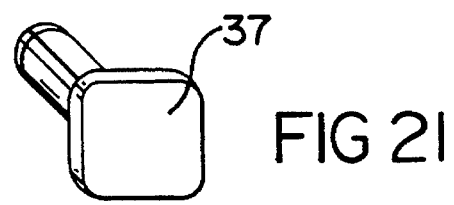
FIG. 21 is a perspective view of a notched nail suitable for supporting the floating caliper.

Referring now to FIGS. 19 through 21, a detail of design may be pointed out which relates to the support of a floating caliper 1 of cast aluminum on the narrow sides of a brake shoe 5. Brake shoe 5 here consists of a backing plate 35 carrying a friction pad (not shown) and provided with hammer-head-type projections 36 on its sides lying in the circumferential direction of the brake disc. In the area of its caliper bridge 4, the floating caliper 1 is supported on a narrow side of the projections 36. As the floating caliper 1 is of cast aluminum and the backing plate 35 is of steel, there may be problems when there is a direct contact between these two parts. Because of the differing electrochemical potentials of the different metals there will be more corrosion at a point of contact. Moreover, the softer aluminum can be damaged by the harder steel by means of increased abrasion. In order to avoid these problems a notched nail 37 is inserted into the floating caliper 1 in the area of the point of contact. The notched nail 37 preferably has a relatively large head of essentially square shape. The notched nail 37 is preferably made of steel and has abutment surfaces 38, 39 disposed to abut on corresponding surfaces of the projections 36. The head of the notched nail projects in the circumferential direction and in the radial direction beyond the side surfaces of the floating caliper so that the material of the floating caliper (cast aluminum) cannot come into contact with the backing plate 35. The mentioned corrosion problems are avoided because only the steel abutment surfaces 38, 39 of the notched nail 37 get into contact with the backing plate 35.

The preceding description is exemplary rather than limiting in nature. Variations and modification are possible without departing from the purview and spirit of this invention, the scope of which is limited only by the appended claims.

What is claimed is:

1. A floating-caliper spot-type disc brake, comprising:

a one piece floating caliper adapted for applying brakes shoes arranged on both sides of a brake disc, said caliper embracing the brake shoes in a U-shaped manner and having a caliper bridge straddling a radially outside edge of the brake disc and the brake shoes, said caliper for transmitting a clamping force for applying the brake shoes against said brake disc;

at least one bolt threaded within the caliper bridge;

said floating caliper being cast from aluminum;

said at least one bolt being made of a high-tensile material and reinforcing said caliper bridge;

said floating caliper having a recess opening toward said brake disc in an area of the caliper bridge adjacent the brake disc;

said at least one bolt having a midsection extending through said caliper recess, said mid-section being disposed in the direct vicinity of the radially outside brake disc edge;

wherein, said caliper recess is constructed such that no portion of the caliper lies directly between said bolt mid-section and said brake disc.

2. A spot-type disc brake as claimed in claim 1, wherein said bolt is a steel screw bolt which at two end sections is positively connected with said floating caliper.

3. A spot-type disc brake as claimed in claim 1, wherein said bolt is axially prestressed against the floating caliper.

4. A spot-type disc brake as claimed in claim 1, wherein said floating caliper is radially supported on a radially outside narrow edge of each of said brake shoes, said floating caliper having said recesses at a point provided for support of a floating caliper, and said bolt extending through said recesses being supported on each of said radially outside brake shoe edges.

5. A spot-type disc brake as claimed in claim 4, wherein said radially outside narrow edge of the brake shoe is adapted to abut said bolt in a curved manner, at said point provided for support of the floating caliper.

6. A spot-type disc brake as claimed in claim 4, wherein said brake shoes further comprise a backing plate carrying a friction pad, with two hammer-head-type projections projecting laterally from the backing plate in the circumferential direction adapted for transmitting the friction forces to a brake carrier and for radial support of the floating caliper on the brake carrier, and wherein said projections include radially outside narrow sides facing the floating caliper and also include concave and essentially cylindrical recesses on whose surfaces said bolt connected with the floating caliper can be supported.

7. A floating-caliper spot-type disc brake, comprising:

a one piece floating caliper adapted for applying brakes shoes arranged on both sides of a brake disc, said caliper embracing the brake shoes in a U-shaped manner and having a caliper bridge straddling a radially outside edge of the brake disc and the brake shoes, said caliper for transmitting a clamping force for applying the brake shoes;

at least one reinforcing element substantially enclosed within a substantially cylindrical bore of said caliper bridge, said cylindrical bore extending essentially parallel to the brake disc axis;

said floating caliper being cast from aluminum light metal and said at least one reinforcing element being made of a high-tensile material;

said at least one reinforcing element being essentially at least one cylindrical pin which, essentially without axial prestress, is disposed within said substantially cylindrical bore in said caliper bridge, said bore essentially running parallel to the brake disc axis.

8. A disc brake as claimed in claim 7, wherein said at least one reinforcing element is made of steel.

9. A disc brake as claimed in claim 8, wherein the surfaces of said at least one reinforcing element are plated with one or more platings belonging to the group consisting of galvanized plating or nickel plating.

10. A disc brake as claimed in claim 7, wherein each said at least one reinforcing element is a hollow cylindrical sleeve.

11. A disc brake as claimed in claim 10, wherein each said sleeve have a slot extending in the longitudinal direction along the entire length of each said sleeve.

12. A disc brake as claimed in claim 7, wherein each said at least one reinforcing element is a massive cylindrical pin.

13. A disc brake as claimed in claim 12, wherein each said pin is provided with a groove extending over its entire length.

14. A disc brake as claimed in claim 7, wherein said at least one reinforcing element is pressed into said bores of said caliper bridge.

15. A disc brake as claimed in claim 7, wherein said bores of said caliper are pocket bores.

16. A disc brake as claimed in claim 15, wherein said at least one reinforcing element is secured within said bores by means of a deformation of an open end of the pocket bores.

17. A disc brake as claimed in claim 7, wherein said at least one reinforcing element comprises twelve reinforcing elements which are arranged symmetrically relative to the brake center in twelve bores of the caliper bridge and, in two superposed rows of six reinforcing elements per row relative to the brake disc axis, and are staggered relative to each other.

18. A disc brake as claimed in claim 7, further comprising second bores with second reinforcing elements plugged into said second bores, arranged in a leg, adjacent to said caliper bridge, said second reinforcing elements essentially extending parallel to the brake disc and essentially perpendicularly to said caliper bridge.

19. A spot-type disc brake as defined in claim 7, wherein said floating caliper mainly consists of cast aluminum;

said caliper bridge being provided with bores running essentially parallel to the brake disc axis, with said at least one reinforcing element designed as screw bolts being screwed into said bores; and said screw bolts consisting of steel and having a threading structure over the entire screw-in length for cutting a thread into the bores when the bolts are screwed in.

* * * * *